(12) United States Patent  
Roche

(10) Patent No.: US 8,832,640 B1
(45) Date of Patent: Sep. 9, 2014

(54) COMPONENT MAPPED SOFTWARE DEVELOPMENT WORKFLOW

(75) Inventor: Michael G. Roche, Hamilton (CA)

(73) Assignee: EMC Corporation, Hopkinton, MA (US)

( * ) Notice: Subject to any disclaimer, the term of this patent is extended or adjusted under 35 U.S.C. 154(b) by 206 days.

(21) Appl. No.: 13/432,491

(22) Filed: Mar. 28, 2012

(51) Int. Cl.
G06F 9/44 (2006.01)

(52) U.S. Cl.
USPC .......................................................... 717/101

(58) Field of Classification Search
USPC .......................................................... 717/101
See application file for complete search history.

(56) References Cited

U.S. PATENT DOCUMENTS

| 6,519,763 B1 * | 2/2003 | Kaufer et al. | 717/101 |
| 8,539,282 B1 * | 9/2013 | Kabanov et al. | 714/38.1 |
| 8,589,358 B2 * | 11/2013 | Lowry et al. | 707/687 |

* cited by examiner

*Primary Examiner* — Don Wong
*Assistant Examiner* — Theodore Hebert
(74) *Attorney, Agent, or Firm* — Van Pelt, Yi & James LLP

(57) ABSTRACT

A method for evaluating a project is disclosed. Information is extracted programmatically from the output generated by two or more project development tools. The extracted information is normalized programmatically based at least in part on a standardized set of metrics. Two or more maps are generated based at least in part on the normalized extracted information, wherein each of the maps includes at least part of the normalized information extracted from a project development tool that generated the output on which the normalized extracted information is based, and wherein the normalized extracted information is associated with a project component with which the corresponding output is associated.

28 Claims, 2 Drawing Sheets

COMPONENT MAPPED SOFTWARE DEVELOPMENT WORKFLOW

BACKGROUND OF THE INVENTION

Different software development tools are available for managing a complex system or software development project during different phases of a development cycle. Although software development tools that are available commercially or as freeware are abundant, the available software development tools are often developed and produced by different vendors, and therefore most of the software development tools are self-contained and work independently of each other. As a result, a project manager often has to evaluate a project in a piecemeal fashion by evaluating the output generated by the different software development tools individually, which is cumbersome and inefficient.

BRIEF DESCRIPTION OF THE DRAWINGS

Various embodiments of the invention are disclosed in the following detailed description and the accompanying drawings.

DETAILED DESCRIPTION

Figure 1:
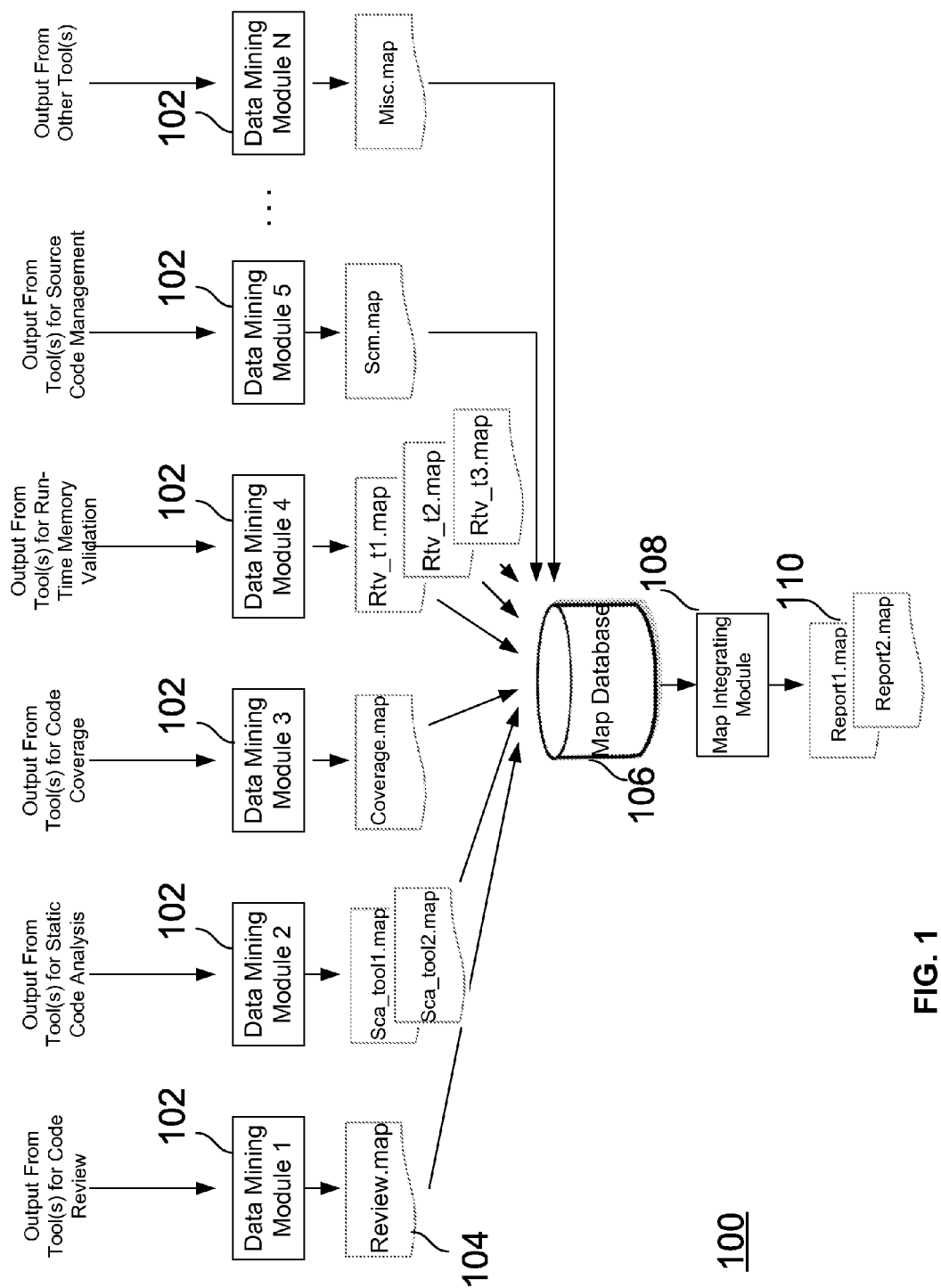
FIG. 1 is a block diagram illustrating an embodiment of a software development mapping system 100.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Component mapped processing of quality and/or other statistics generated by various tools and/or processes in the course of a development project is disclosed. In various embodiments, information is extracted from the output generated by two or more project development tools. The extracted information is normalized based at least in part on a standardized set of metrics. In various embodiments, two or more maps are generated, and they are generated based at least in part on the normalized extracted information. In some embodiments, the generated maps are further stored in a database. In some embodiments, the project is evaluated based at least in part on the two or more generated maps.

A system development life cycle (SDLC) model, or software development process, describes various phases of a system or software development cycle and the order in which the phases are executed. For example, during a planning phase, the requirements of the system or software are extracted and documented. Following the planning phase is the design phase, in which the requirements are translated into a design. Code is then produced based on the design during an implementation phase. Finally, during the testing phase, the deliverables of the implementation phase are verified against the system requirements.

Different software development tools are available for managing a complex system or software development project during different phases of a development cycle. For example, software development tools include tools for code review, static code analysis (SCA), code coverage, run-time memory validation, defect tracking, source code management (SCM), and the like. Code review tools, such as Review Board, check the source code for compliance with a predefined set of rules or best practice. Static code analysis tools, such as Coverity and Pattern Insight, analyze software without actually executing programs built from that software. Code coverage tools, such as Parallocity, inspect the software code directly and describe the degree to which the software code of a program has been tested. Run-time memory validation tools, such as Purify and Parallocity, discover memory errors that occur when the program runs. Defect tracking tools, such as Bugzilla and CQ, help quality assurance personnel and programmers to keep track of reported software bugs in a project. Source code management tools, such as CVS and Perforce, manage changes to programs made by a team of developers. Although software development tools that are available commercially or as freeware are abundant, the available software development tools are often developed and manufactured by different vendors, and therefore most of the software development tools are self-contained and work independently of each other.

For instance, software development tools typically do not communicate to each other. The software development tools do not have built-in mechanisms for allowing information or statistics that are collected by one software development tool to be exported to or imported from another software development tool. If multiple software development tools are utilized in a particular phase of a development cycle, information collected by one software development tool cannot be passed on to another software development tool for a more complete or cross analysis. When a development cycle moves from one phase to another, information collected by the software development tool used in a prior phase cannot be passed on to the software development tool used in a subsequent phase. As a result, a project manager or a software developer cannot evaluate or look at the entire history of a development cycle or compare two development cycles of different products or projects in a consistent manner by generating a single report, for example. Similarly, information collected by different software development tools cannot be used as a feedback for making future improvement or adjustments to the software development project.

In addition, software development tools typically do not have a standardized set of metrics. The definitions of quality, efficiency, cost, effectiveness, and the like, may be different for different software development tools. Hence, quality, efficiency, cost, or effectiveness cannot be evaluated, compared, or described consistently across different software development tools, resulting in subjective analysis, as opposed to objective analysis, by project managers.

FIG. 1 is a block diagram illustrating an embodiment of a software development mapping system 100. As shown in FIG. 1, software development mapping system 100 includes a plurality of data mining modules 102. In some embodiments, a different data mining module may be used to extract information from the output generated by a particular type of software development tool. For example, as shown in FIG. 1, data mining module 1 (102) may be used to extract information from the output generated by one or more tools for code review purposes. Similarly, a plurality of data mining modules may be used to extract information from the output generated by software development tools for static code analysis, code coverage, run-time memory validation, defect tracking, source code management (SCM), and the like. In some embodiments, a data mining module may be used to extract information from the output generated by two or more different types of software development tools. For example, the output generated by the two or more different types of software development tools have certain common features, and the data mining module may be used to extract the information related to those common features.

In some embodiments, data mining modules 102 may be implemented as an executable program, and the source code of the executable program may be configured and compiled by a top-level administrator. In some embodiments, data mining modules 102 may be implemented as a computer script. For example, a data mining module may be a file containing instructions written in a certain scripting language, and the file may be opened and edited using a basic text editor. In one example, the development team for a particular product or project (development team 1) may use one software development tool for static code analysis, e.g., Coverity, and the development team for another product or project within the same company (development team 2) may use a different software development tool, e.g., Pattern Insight, for the same purpose. Each of the development teams may modify the data mining module corresponding to static code analysis for its own use such that the data mining module extracts information from the output generated by its respective static code analysis tool. The data mining module corresponding to static code analysis may then normalize the extracted information and output the normalized extracted information as a standardized and generic statistical map 104 (e.g., sca_tool1.map for development team 1 using the Coverity tool and sca_tool2.map for development team 2 using the Pattern Insight tool, as shown in FIG. 1), as will be described in greater detail below. Note that the two generated maps for the two development teams have the same standardized and generic format, even though the two development teams are utilizing two different software development tools.

Because the output from different software development tools may have different output formats, data mining modules 102 include capabilities to interpret input in different formats and extract certain useful information from the input based on the formats. Some of the software development tools direct their output to a log file as ASCII text. For example, the ASCII log files generated by the run-time memory validation tool, Purify, include information such as directory names, module names, memory address errors, run-time error messages, and the like. The corresponding data mining module thus parses the log file and extracts the above information based on the ASCII format. Some of the software development tools generate output as data structures. For example, the code review tool, Review Board, stores its metadata (e.g., source code, comments, and reviewers names) in an SQL database. Accordingly, the corresponding data mining module for code review tool(s) interprets and extracts the output based on SQL queries. The output from the SQL queries could be generated in different formats, including the ASCII format, XML, and the like.

As described earlier, statistical maps 104 generated by a particular data mining module 102 are standardized and generic. These statistical maps 104 may be stored in a database 106, as shown in FIG. 1. Statistical maps 104 generated by a particular data mining module 102 may include any kind of statistical information that a project manager or software developer may want to derive from that element or phase of the development cycle. For example, statistical maps 104 generated for code review tools may include a list of review comments submitted by team members, the time and dates corresponding to the review comments, the name or identification of the module corresponding to the review comments, the number of review comments, the number of reviewers, the number of times a particular review comment has been viewed, the number of iterations of code changes, and the like. In another example, statistical maps 104 generated for defect tracking tools may include a list of bugs submitted by quality assurance team members, the status of the bugs, the time and dates corresponding to the bugs, the name or identification of the module corresponding to the bugs, the number of bugs, the number of iterations of code changes in response to the bug, and the like.

With continued reference to FIG. 1, software development mapping system 100 further includes a map integrating module 108. In some embodiments, map integrating module 108 integrates a plurality of statistical maps 104 (e.g., tens or hundreds of statistical maps 104) stored in map database 106 together and generates an overall map 110. For example, some or all of the statistical maps 104 corresponding to a particular development cycle and generated by different data mining modules 102 may be integrated or overlaid together to generate an integrated map or an overall map 110. In another example, some or all of the statistical maps 104 corresponding to one or more development teams (or one or more products) may be integrated or overlaid together to generate an overall map 110 for analysis and comparison.

As described above, statistical maps 104 generated by a particular data mining module 102 are standardized and generic. Furthermore, a standardized set of metrics for defining quality, efficiency, cost, effectiveness, or other types of statistical data, may be used in statistical maps 104. Accordingly, statistical maps 104 may be integrated and overlaid together to generate an overall map 110 for objective comparison or analysis.

In some embodiments, overall map 110 may be output as a report in different formats, including portable document format (PDF), Microsoft WORD, Microsoft Excel, and the like. In some embodiments, overall map 110 may be displayed as an interactive report on a computer terminal or screen. The interactive report may display different levels of statistics. For example, by specifying a particular time period or a particular module, the corresponding statistics may be displayed. Alternatively, a global set of statistics may be displayed in the interactive report.

In some embodiments, the plurality of data mining modules 102 in software development mapping system 100 are used to periodically extract information from different types of software development tools throughout the entire development cycle. As newer statistical maps 104 are continuously overlaid onto the older statistical maps 104 to re-generate the overall map 110, the overall map 110 may be used by a project manager or other decision makers for trend analysis. The overall map 110 allows a project manager to continuously monitor the progress of his/her project over time. For example, the project manager may continuously review the statistics associated with different software modules/components or areas of the software code that are defined in a consistent manner. The project manager may also review events that have happened, e.g., events that have happened to a particular source code module or events that are triggered by a particular unit.

In some embodiments, software development mapping system 100 may further include features for correlating statistics and information in different phases of the development cycle. For example, a set of defects in a module identified by a defect tracking tool may be correlated with information about code changes in the module collected by a code review tool. The correlated information may provide feedback to the developers responsible for the code changes. In some embodiments, the correlated information may further be used to provide an alert. For example, if a high number of defects are detected after a particular event or a pattern of events, an alert may be generated and provided in the overall map 110 to indicate potential issues and bottlenecks.

Figure 2:
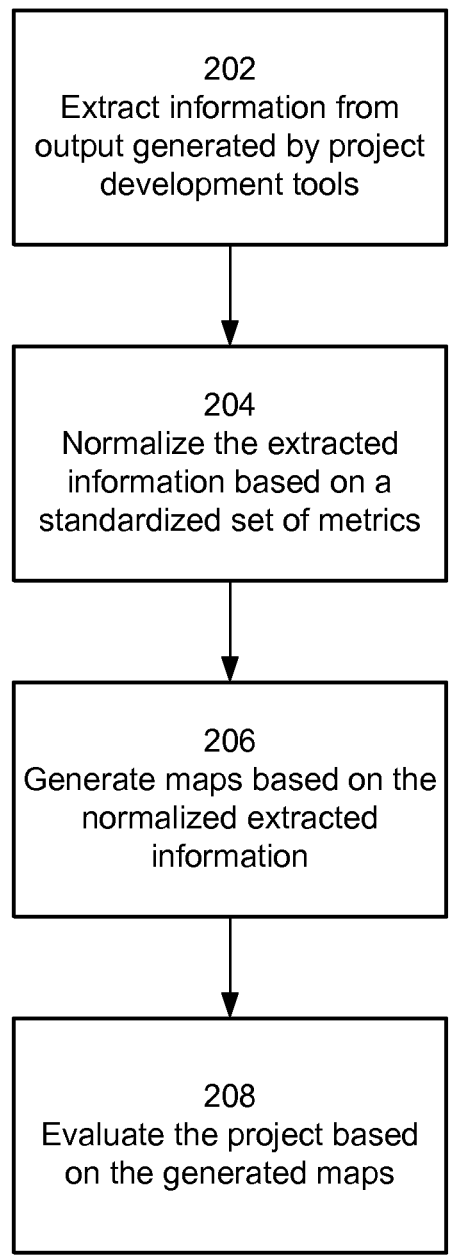
FIG. 2 is a diagram illustrating an exemplary process 200 for evaluating a project, e.g., a software development project.

FIG. 2 is a diagram illustrating an exemplary process 200 for evaluating a project, e.g., a software development project. In some embodiments, process 200 is a process executed on software development mapping system 100, as shown in FIG. 1.

At 202, information is extracted from the output generated by two or more project development tools. For example, the types of project development tools include code review, static code analysis, code coverage, run-time memory validation, defect tracking, source code management, and the like. In some embodiments, each of the project development tools may be a tool for a particular phase of a development cycle of a project. For example, the phases may include the planning phase, design phase, testing phase, and the like. In some embodiments, data mining modules are used to extract information from the output generated by the project development tools. In some embodiments, a data mining module is used to extract information from the output generated by a particular type of project development tool. For example, one data mining module is used to extract information from the output generated by a set of code review tools, and another data mining module is used to extract information from the output generated by a set of defect tracking tools. The information extracted from the output generated by a set of code review tools may include statistical information, such as a list of review comments submitted by team members, the time and dates corresponding to the review comments, the name or identification of the module corresponding to the review comments, the number of review comments, the number of reviewers, the number of times a particular review comment has been viewed, the number of iterations of code changes, and the like. The information extracted from the output generated by the set of defect tracking tools may include a list of bugs submitted by quality assurance team members, the status of the bugs, the time and dates corresponding to the bugs, the name or identification of the module corresponding to the bugs, the number of bugs, the number of iterations of code changes in response to the bug, and the like. In some embodiments, the data mining modules may be implemented as an executable program. In some embodiments, the data mining modules may be implemented as a computer script.

Because the output from different software development tools may have different output formats, the data mining modules include capabilities to interpret input in different formats and extract certain useful information from the input based on the formats. For example, the formats include ASCII format, SQL format, and the like.

At 204, the extracted information is normalized based at least in part on a standardized set of metrics. For example, the standardized set of metrics may include metrics defining quality, efficiency, cost, effectiveness, and the like, in standardized terms and units.

At 206, two or more maps are generated, and they are generated based at least in part on the normalized extracted information. For example, each of the maps may include at least part of the normalized information extracted from a project development tool that generated the output on which the normalized extracted information is based. The normalized extracted information is associated with a project component (e.g., a software module or unit) with which the corresponding output is associated. In some embodiments, the generated maps are further stored in a database.

At 208, the project is evaluated based at least in part on the two or more generated maps. For example, evaluating the project includes integrating the generated maps into an integrated map for evaluating the project. In some embodiments, the information in the integrated map is organized based on project components. In some embodiments, the normalized extracted information associated with a project component from two or more maps may be combined together or overlaid over each other. In some embodiments, the integrated map includes an interactive report displayable on a computer terminal. In some embodiments, the interactive report may be configured to display a portion of the integrated map corresponding to a particular software module or unit. In some embodiments, the interactive report may be configured to display a portion of the integrated map corresponding to a particular time period or a particular phase of the development cycle.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for evaluating a project, comprising:
   extracting information programmatically from output generated by two or more project development tools using a plurality of data mining modules, wherein a single data mining module is capable of extracting information from output that is generated by a single type of project development tools, and wherein a single data mining module is capable of extracting information from output that is generated by one or more project development tools of the same type but developed by different vendors;
   each data mining module normalizing the extracted information extracted from the output that is generated by the one or more project development tools of the same type but developed by different vendors programmatically based at least in part on a standardized set of metrics in standardized terms and units, wherein the extracted information prior to normalization is represented by different sets of metrics, each using different terms and units; and generating two or more maps based at least in part on the normalized extracted information, wherein each of the maps includes at least part of the normalized information extracted from a project development tool that generated the output on which the normalized extracted information is based, and wherein the normalized extracted information is associated with a project component with which the corresponding output is associated.

2. The method of claim 1, further comprising evaluating the project based at least in part on the two or more maps.

3. The method of claim 1, wherein the extracting of the information is performed two or more times during a development cycle of the project, and wherein evaluating the project is performed two or more times during the development cycle for a trend analysis.

4. The method of claim 1, further comprising integrating the two or more maps into an integrated map for evaluating the project.

5. The method of claim 4, wherein the integrated map comprises an interactive report displayable on a terminal.

6. The method of claim 5, wherein the interactive report is configured to display a portion of the integrated map corresponding to a software module.

7. The method of claim 5, wherein the interactive report is configured to display a portion of the integrated map corresponding to a time period.

8. The method of claim 1, further comprising storing the generated two or more maps in a database.

9. The method of claim 1, further comprising correlating information extracted from output generated by a first project development tool to information extracted from output generated by a second project development tool.

10. The method of claim 1, wherein the standardized set of metrics includes metrics defining one or more of the following: quality, efficiency, cost, and effectiveness.

11. The method of claim 1, wherein the output generated by a first project development tool includes output in a first format, and wherein the output generated by a second project development tool includes output in a second format, and wherein the first format and the second format are different.

12. The method of claim 1, wherein extracting information comprises extracting the information using a programmable script.

13. The method of claim 1, wherein types of the two or more project development tools include one or more of the following: code review, static code analysis, code coverage, run-time memory validation, defect tracking, and source code management.

14. The method of claim 1, wherein each of the two or more project development tools comprises a project development tool for a corresponding phase of a development cycle of the project.

15. The method of claim 1, wherein generated maps generated by a data mining module that extracts output from a particular type of project development tool have a standardized format.

16. A system for reviewing a project, comprising:
a processor configured to:
extract information from output generated by two or more project development tools using a plurality of data mining modules, wherein a single data mining module is capable of extracting information from output that is generated by a single type of project development tools, and wherein a single data mining module is capable of extracting information from output that is generated by one or more project development tools of the same type but developed by different vendors;
normalize the extracted information extracted by each data mining module extracted from the output that is generated by the one or more project development tools of the same type but developed by different vendors based at least in part on a standardized set of metrics in standardized terms and units, wherein the extracted information prior to normalization is represented by different sets of metrics, each using different terms and units; and
generate two or more maps based at least in part on the normalized extracted information, wherein each of the maps includes at least part of the normalized information extracted from a project development tool that generated the output on which the normalized extracted information is based, and wherein the normalized extracted information is associated with a project component with which the corresponding output is associated; and
a memory coupled to the processor and configured to provide the processor with instructions.

17. The system of claim 16, wherein the extracting of the information is performed two or more times during a development cycle of the project, and wherein evaluating the project is performed two or more times during the development cycle for a trend analysis.

18. The system of claim 16, wherein the memory is further configured to integrate the two or more maps into an integrated map for evaluating the project.

19. The system of claim 18, wherein the integrated map comprises an interactive report displayable on a terminal.

20. The system of claim 19, wherein the interactive report is configured to display a portion of the integrated map corresponding to a software module.

21. The system of claim 19, wherein the interactive report is configured to display a portion of the integrated map corresponding to a time period.

22. The system of claim 16, wherein the memory is further configured to provide the processor with instructions which when executed cause the processor to correlate information extracted from output generated by a first project development tool to information extracted from output generated by a second project development tool.

23. The system of claim 16, wherein types of the two or more project development tools include one or more of the following: code review, static code analysis, code coverage, run-time memory validation, defect tracking, and source code management.

24. The system of claim 16, wherein generated maps generated by a data mining module that extracts output from a particular type of project development tool have a standardized format.

25. The system of claim 16, wherein the memory is further configured to evaluate the project based at least in part on the two or more maps.

26. A computer program product for evaluating a project, the computer program product being embodied in a non-transitory tangible computer readable storage medium and comprising computer instructions for:
extracting information from output generated by two or more project development tools using a plurality of data mining modules, wherein a single data mining module is capable of extracting information from output that is generated by a single type of project development tools, and wherein a single data mining module is capable of extracting information from output that is generated by one or more project development tools of the same type but developed by different vendors;

each data mining module normalizing the extracted information extracted from the output that is generated by the one or more project development tools of the same type but developed by different vendors based at least in part on a standardized set of metrics in standardized terms and units, wherein the extracted information prior to normalization is represented by different sets of metrics, each using different terms and units; and generating two or more maps based at least in part on the normalized extracted information, wherein each of the maps includes at least part of the normalized information extracted from a project development tool that generated the output on which the normalized extracted information is based, and wherein the normalized extracted information is associated with a project component with which the corresponding output is associated.

27. The computer program product recited in claim 26, further comprising computer instructions for evaluating the project based at least in part on the two or more maps.

28. The computer program product recited in claim 26, further comprising computer instructions for integrating the two or more maps into an integrated map for evaluating the project.

* * * * *